United States Patent [19]

Russell

[11] Patent Number: 4,914,377

[45] Date of Patent: Apr. 3, 1990

[54] RADIO FREQUENCY CAPACITANCE PROBE SYSTEM FOR MATERIAL DETECTION

[75] Inventor: Craig A. Russell, Elburn, Ill.

[73] Assignee: Ludlow Industries, Inc., Elburn, Ill.

[21] Appl. No.: 236,639

[22] Filed: Aug. 25, 1988

[51] Int. Cl.$^4$ .............................................. G01R 27/26
[52] U.S. Cl. ...................................... 324/690; 73/1 H; 73/304 C; 324/675
[58] Field of Search ............... 324/61 R, 61 P, 61 QS, 324/61 QL; 73/304 C, 1 R, 1 H

[56] References Cited

U.S. PATENT DOCUMENTS

| 4,347,741 | 9/1982 | Geiger | 73/304 C |
| 4,499,767 | 2/1985 | Fathauer et al. | 324/61 R X |
| 4,589,281 | 5/1986 | Aldrich | 73/304 C X |
| 4,624,139 | 11/1986 | Collins | 73/304 C |
| 4,723,122 | 2/1988 | Maltby | 73/304 C X |

Primary Examiner—Reinhard J. Eisenzopf
Assistant Examiner—Robert W. Mueller
Attorney, Agent, or Firm—Burmeister, York, Palmatier & Zummer

[57] ABSTRACT

A capacitance probe extends into a container for material which increases the capacitance between the probe and the container when the material contacts the probe. A fixed RF voltage is supplied to the base of a transistor in an electronic translator having a capacitor between the probe and the transistor's emitter. A first diode conducts between the base and RF ground. A second diode conducts between the emitter and the base. A small-value capacitor is connected between an ungrounded DC supply terminal and the probe. A third diode conducts variable DC to the transistor's collector from a variable DC signal line supplied with DC for the DC terminal through a resistor. A comparator has a first input connected to the line and a second input connected to a reference voltage. The comparator's output is adapted to energize an output signal and a relay when the DC signal on the line drops below the reference voltage. Additional DC is supplied to the line by an RF driven calibration transistor functioning as an electronically variable resistance controlled by an electronic stepper, for increasing the DC signal line voltage to compensate for material adhering to the probe. The stepper is reset and started by a switch, and is stopped by a second comparator having a first input connected to the signal line and a second input supplied with a higher adjustable reference voltage affording sensitivity adjustment. The stepper controls a capacitance bank connected to the calibration transistor.

20 Claims, 3 Drawing Sheets

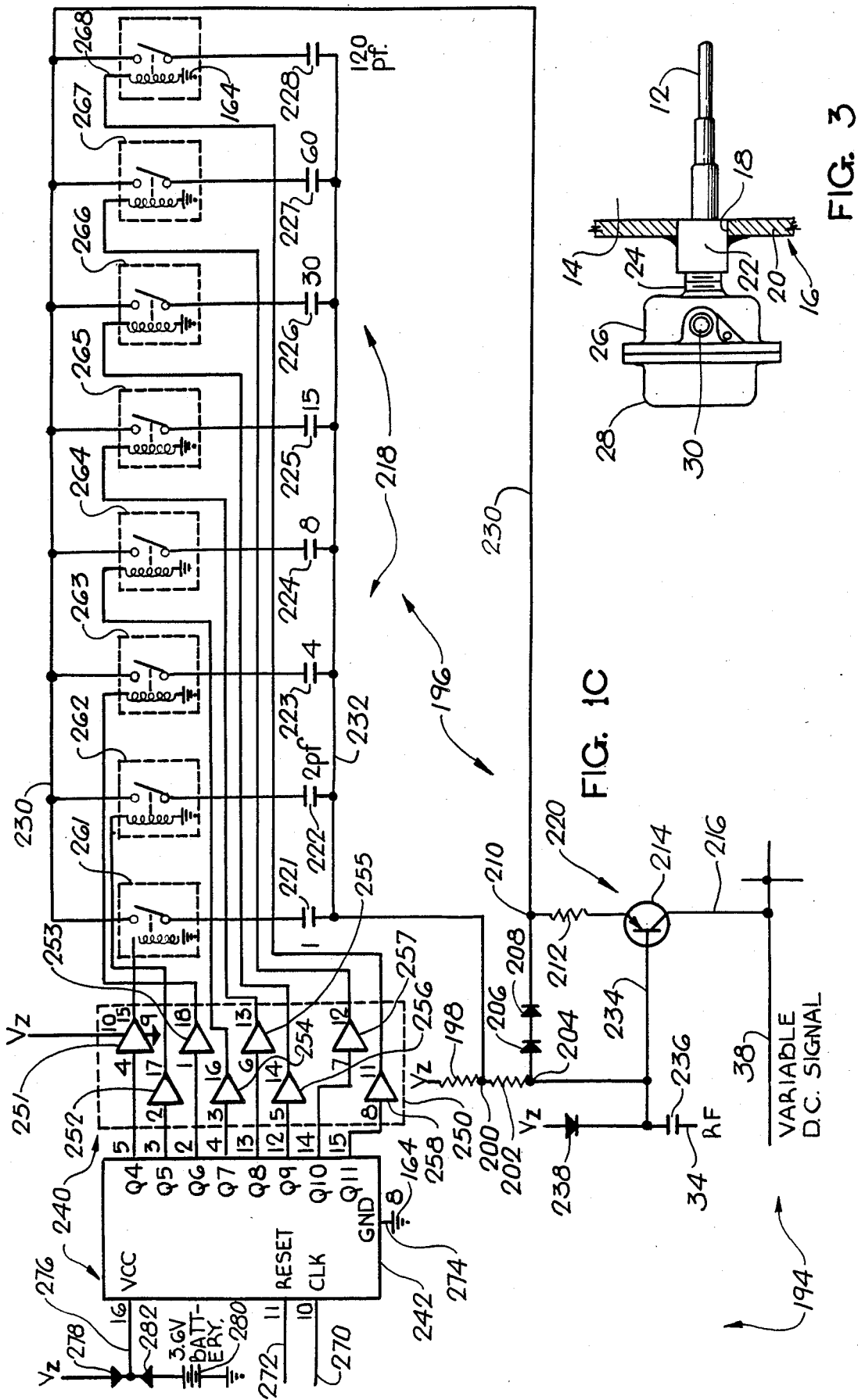

RADIO FREQUENCY CAPACITANCE PROBE SYSTEM FOR MATERIAL DETECTION

FIELD OF THE INVENTION

This invention relates to a system or apparatus utilizing a radio frequency (RF) capacitance probe or electrode for detecting the presence or absence of a flowable material, in various containers, receptacles or ducts, such as bins, tanks, vats, pipes or the like. In such systems, an electrode probe is inserted or positioned in the space or location where the material is to be detected. When the material is absent, the probe has a low electrical capacitance to ground or to the surrounding or adjacent container. When the material is present, in close proximity or in contact with the probe, the capacitance is increased. The increase in the capacitance of the probe is detected or measured by the use of a radio frequency circuit whereby the probe is supplied with a radio frequency voltage, at least under certain operating conditions.

BACKGROUND OF THE INVENTION

Radio frequency probe systems are known and are useful for detecting the presence or absence of flowable materials, so that such systems may be employed to provide bin level indicators and control systems, tank level indicators, and material detection and control systems. Radio frequency capacitance probe systems are particularly useful for detecting difficult materials, which are difficult to detect by the use of other types of material detectors, such as devices using rotatable paddles, upon which the material imposes drag, or pressure detectors, which respond to the pressure or weight of the material. Other difficult materials can do damage to other types of material detectors. Radio frequency capacitance probes can be built in such a manner that they are relatively invulnerable to damage. Some examples of such difficult materials are powders, such as plastic powders, slaked lime, carbon fluff, iron oxide, general dust, sugar, flour and many others; granules, such as plastic pellets, metal pellets, chemical fertilizers, grains and many others; lumps, such as coal, caustic lime, ore, gravel and many others; liquids, such as fuel, solvents, acids, alkali, liquified gas, distilled water and others; mixed liquids, such as factory waste, sewage, slurries and many others; foam, such as latex foam, beer foam, soap foam and others; viscous materials, such as mud, sludge, tar, paint, grease, adhesive paste, soap, paraffin, cheese, honey and others; and interfaces between materials, such as oil and water, mercury and water, alcohol and acid, sediment in water, liquid and foam, and others.

Various methods and devices have been used for measuring or detecting the electrical capacitance of an electrode or probe in material detection systems. One method has been to connect the capacitance of the probe into a radio frequency oscillator circuit, in such a manner that the oscillating frequency of the oscillator circuit is changed by changes in the capacitance of the probe. The frequency of the radio frequency oscillations is then measured, and changes are used to actuate indicating devices or a control system. In certain material detection systems, the frequency is measured by converting the radio frequency signals into pulses, counting the pulses electronically, and interpreting the counted results with the aid of a microprocessor. Another method has been to connect the capacitance of the probe into a radio frequency oscillator circuit in such a manner that the increasing capacitance of the probe causes the oscillator to commence oscillating.

Many difficult materials cause a problem in that they cling or adhere to the probe or electrode, so that the adherent material changes the initial capacitance of the probe. When the probe has just been installed, and has not been touched by the material, the electrical capacitance of the typical small probe is quite low, perhaps on the order of one picofarad (pf). When the material contacts or surrounds the probe, the capacitance is materially increased, and this increase is detected and used to change the state of an indicator or a control system. When the material recedes or moves out of contact with the probe, some of the material clings or adheres to the probe. As a result, the capacitance of the probe does not return to its initial low value, but rather decreases to a somewhat higher value than the initial value. Thus, it can be said that the calibration of the probe has been changed by the adherent material. The capacitance value of the probe when material is present around the probe is still substantially higher than the capacitance value when the body of the material is absent from the probe, but the material-absent value of the capacitance is higher than the initial capacitance value of the probe. This change in the calibration of the probe creates a need to recalibrate the system which is employed to differentiate between the material-present value and the material-absent value of the capacitance. If the system is too sensitive, it may experience difficulties in differentiating reliably between the material-present and the material-absent capacitance values of the probe. Thus, a need arises to provide a system having a variable or adjustable sensitivity.

SUMMARY OF THE INVENTION

One object of the present invention is to provide a new and improved radio frequency (RF) capacitance probe system for material detection, whereby the increased capacitance of a probe, due to the presence of the material in proximity to the probe, is translated into an electrical signal in a new and improved manner, for use in actuating or deactuating a useful device, such as an indicator or a control system, for controlling the movement or the level of the material.

A further object is to provide a new and improved capacitance probe system of the foregoing character, having improved means for recalibrating the system, to compensate for changes in the calibration of the probe, due to material which clings or adheres to the probe, after the body of the material recedes from the probe.

Another object is to provide a new and improved RF capacitance probe system, having improved recalibrating means whereby the recalibration of the system may be initiated at any convenient time, and will be automatically accomplished by the recalibrating means.

It is a further object to provide a new and improved RF capacitance probe system of the foregoing character, having improved recalibrating means including sensitivity adjustment means for adjusting or varying the sensitivity of the probe system to capacitance changes whereby the reliability of the probe system is improved so that it is better able to distinguish between the material-absent capacitance and the material-present capacitance of the probe.

Another object is to provide a new and improved RF capacitance probe system of the foregoing character, having improved recalibration means utilizing a balancing circuit, whereby the increased material-absent capacitance of the probe, due to adherent material, is balanced by varying or adjusting a balancing capacitance in the balancing circuit.

It is a further object of the present invention to provide a new and improved RF capacitance probe system utilizing inexpensive electronic circuits having a minimum of readily available components, and without resorting to the complexities of utilizing a microprocessor.

To achieve these and other objects, the present invention preferably provides a radio frequency capacitance probe system for material detection, comprising a capacitance electrode or probe adapted to be located in or inserted into a space where the material is to be detected, a radio frequency source for producing a radio frequency voltage, and an electronic control device having RF input means for receiving the radio frequency voltage and RF output means connected to the probe for delivering an RF output to the probe. The probe exhibits an increased electrical capacitance and consequently a decreased capacitive reactance to ground when the material to be detected is present in proximity to the probe. The first control device also has a signal output for producing a unidirectional output signal having a magnitude which corresponds with the capacitance of the probe. The system also comprises output means for receiving the output signal and for performing at least one output function in response to the variation of the output signal to a particular magnitude. For example, the output function may comprise the actuation or deactuation of a relay which may actuate or deactuate an indicator, or may actuate or deactuate a material control system for causing the starting or stopping of a flow of the material into or out of the space in which the probe is located. Thus, the level of the material may be detected, indicated and controlled, either as to a low level or a high level, as desired.

The electronic control device may comprise an electronic circuit utilizing a transistor or some other active electronic component, for translating the variable capacitance of the probe into an output signal which varies as a function of the capacitance of the probe. The output signal may comprise a variable direct current or a variable DC voltage which increases or decreases with increasing capacitance of the probe. The electronic control circuit may act in the manner of an electronic filter to vary the transmitted RF signal, in accordance with variations in the capacitance of the probe, and to translate the transmitted RF signal into a variable unidirectional output signal.

The output means may comprise a comparator or some other active electronic component for comparing the variable output signal with a reference signal and for initiating the output function when the output signal becomes less than or greater than the reference signal, as desired.

The RF capacitance probe system may also include a recalibrating device or circuit for recalibrating the system, to compensate for changes in the calibration of the probe, due to such factors as adherent material on the probe, which tends to increase the minimum or material-absent capacitance of the probe, to a value greater than the initial capacitance.

The recalibrating circuit may comprise a balancing circuit, for producing a balancing or neutralizing signal, for balancing or neutralizing any change in the output signal due to a calibration change of the probe. Means may be employed for combining the balancing signal with the original output signal in such a way that the change in the output signal, due to changing calibration of the probe, is either partially or completely neutralized, as desired.

The recalibrating circuit also preferably comprises a sensitivity adjustment circuit for adjusting or varying the sensitivity of the system to changes in the capacitance of the probe. With high sensitivity, a relatively small change in the capacitance of the probe will initiate an output function. With low sensitivity, a larger change in the capacitance of the probe will be required to initiate an output function. Having the ability to adjust the sensitivity of the system makes it possible to increase the immunity of the system to false or undesired initiation of output functions.

The calibrating circuit preferably comprises a balancing circuit having a variable or switchable balancing capacitance, which can be adjusted to a capacitance value comparable to the material-absent capacitance of the probe. In one preferred embodiment, the variable capacitance comprises a bank of individual capacitors, having different capacitance values arranged in a binary sequence such that each successive value is approximately twice the value of the previous capacitance in the sequence. In this embodiment, an electronic binary stepper or switching means may be employed to switch various parallel combinations of the capacitors into the balancing circuit, so that the value of the variable capacitance can be stepped from zero to any integral value ranging from one picofarad (pf) to the sum of all of the capacitance values in the capacitance bank. Thus, for example, the capacitors may have values of 1, 2, 4, 8, 15, 30, 60 and 120 picofarads. With this sequence, the total capacitance value can be stepped from zero to 240 picofarads in steps of 1 picofarad. In connection with the binary stepper, the system may comprise means, such as a manually operable push button switch, for resetting the stepper and for automatically initiating a new stepping sequence in the stepper, so that the variable capacitance is stepped upwardly through the sequence, which may be accomplished rapidly by electronic pulsing means.

The variable capacitance may be connected into the balancing circuit by a second electronic control device or circuit having a second RF input for receiving the RF voltage and second RF output means for supplying a second RF output to the variable capacitance. The second electronic control device may have a second signal output for producing a second or balancing output signal which is combined in a balancing manner with the first variable output signal, derived from the first-mentioned electronic control device to which the probe is connected. The balancing circuit combines the two output signals to produce a combined variable output signal, in which the balancing signal component, due to the variable capacitance, tends to neutralize changes in the signal component due to the capacitance of the probe, so that any change in the calibration of the probe is at least partially neutralized by the balancing action of the variable capacitance circuit. The combined variable output signal is supplied to the comparator or other output means for initiating the desired output function, when the capacitance of the probe is increased by proximity of the material to be detected.

The recalibrating circuit preferably comprises sensitivity adjustment means for adjusting the extent to which the capacitance of the probe must change in order to trigger an output function. With a high sensitivity adjustment, the required change in the probe capacitance is relatively small. As the sensitivity is adjusted downwardly, the required change in the probe capacitance becomes greater, to initiate the desired output function.

In the embodiment utilizing the pulse-driven binary stepper, the system preferably comprises a second comparator or other output means for responding to the combined variable output signal for stopping the stepper when the combined variable output signal reaches a second magnitude, differing from the first magnitude, at which the desired output function is initiated. The sensitivity adjustment may comprise means for adjusting the difference between the first and second magnitudes. In the embodiment utilizing the second comparator, the sensitivity adjustment may comprise means for adjusting the reference voltage supplied to the second comparator, so that the second reference voltage, supplied to the second comparator, is different from the reference voltage supplied to the first-mentioned comparator, by an amount which is adjustable to adjust the sensitivity. A bank of switchable resistors may be employed to adjust the second reference voltage.

The system may include an indicating circuit including an indicator light to show when calibration is taking place and when it has been accomplished.

DESCRIPTION OF THE DRAWINGS

Further objects, advantages and features of the present invention will appear from the following detailed description, taken with the accompanying drawings, in which:

FIGS. 1A, 1B, 1C and 1D, taken together, constitute a complete schematic circuit diagram of a radio frequency capacitance probe system for material detection, to be described as a preferred but illustrative embodiment of the present invention.

FIG. 2 is a diagram showing the manner in which FIGS. 1A-1D are combined or laid together, so as to constitute a complete circuit diagram.

FIG. 3 is an elevational outline drawing of one type of a radio frequency capacitance probe, removably installed in a wall of a bin or other container, the bin wall being shown in section.

DETAILED DESCRIPTION OF ILLUSTRATIVE EMBODIMENT

Figures 1A, 1B, 2:
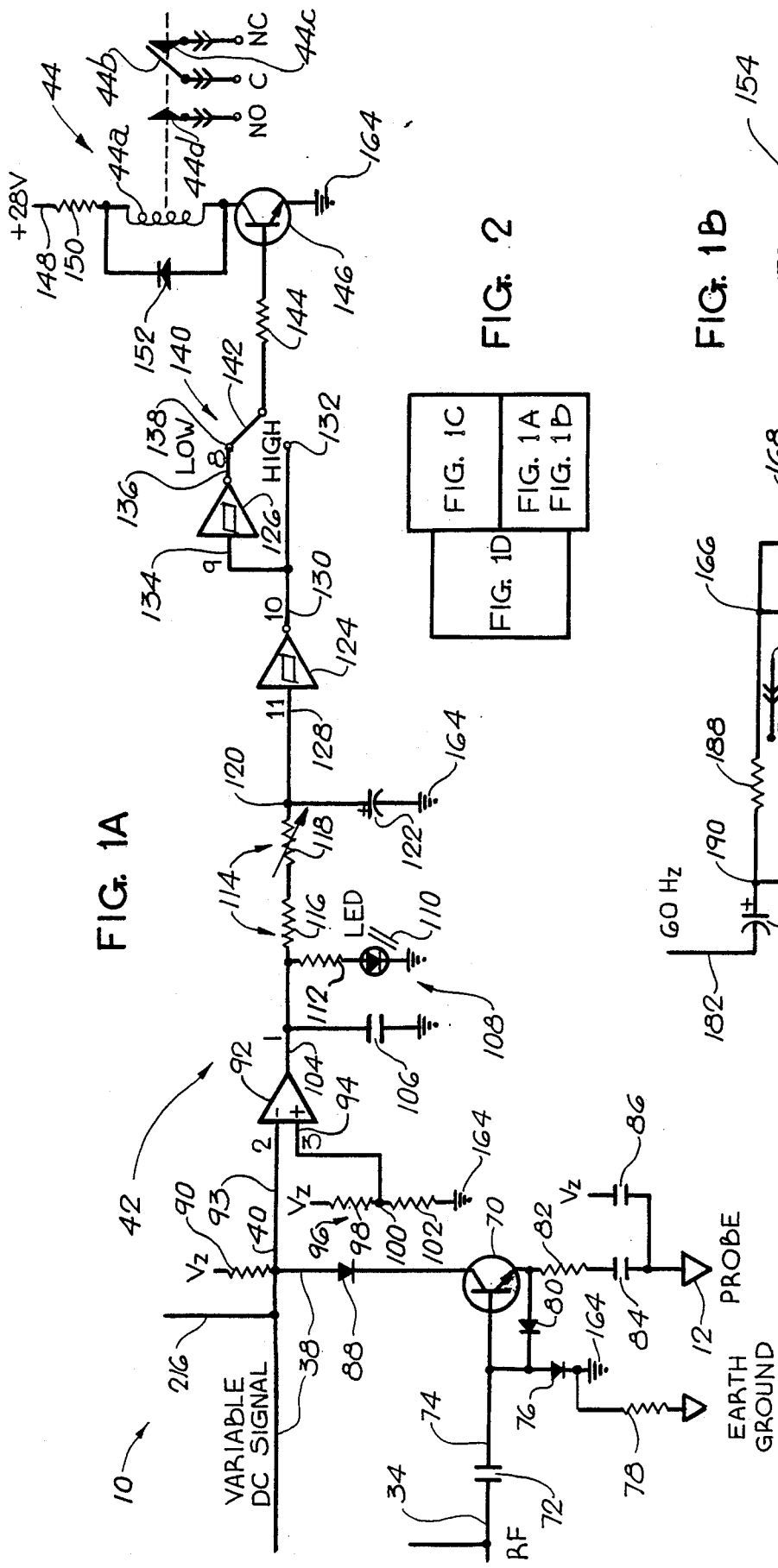

As just indicated, FIGS. 1A, 1B, 1C and 1D, when combined or laid together in the manner shown in FIG. 2, constitute a complete schematic circuit diagram of a radio frequency (RF) capacitance probe system for material detection, to be described as a preferred but illustrative embodiment of the present invention. The system 10 comprises an RF probe or electrode 12, located in or inserted into a space where the presence of a material is to be detected. Examples of suitable materials have already been enumerated above. Typically, the probe is inserted into a bin, tank, pipe or other container. The probe 12 is electrically insulated from earth ground and the walls of the container, in any known or suitable manner.

FIG. 3 is an elevational outline drawing showing one rather typical form of the RF capacitance probe 12, although the probe may assume any other known or suitable form. FIG. 3 shows the probe 12 in the form of a metal electrode rod, removably inserted into a space 14 within a bin or other container 16 through an opening 18 in one wall 20 of the container 16, which is illustrated as being made of metal and thus being electrically conductive. In order that the probe 12 may be removably mounted in the opening 18, a pipe coupling 22 is welded or otherwise secured into the opening 18. Other mounting means may be employed. The pipe coupling 22 is hollow and cylindrical in form and is internally threaded for receiving an externally threaded nipple or stub 24 on an equipment housing 26, in which the electronic circuits for the probe 12 are housed. The housing 26 may have a removable cover 28, with a sealed joint between the cover and the housing. As shown, the housing 26 is formed with a bore or opening 30, adapted to receive a conduit, through which electrical connecting wires may be brought into the housing 26.

The RF capacitance probe 12 is electrically insulated from earth ground and from the container wall 20 and the housing 26. If desired, the probe 12 may be covered with an electrically insulating sheath, not shown, which may be made of a durable electrically insulating material, such as Teflon, for example. The probe 12 is shown as a rod, but may assume many other forms, such as a disc or button which may be recessed into an opening or cavity in the wall 16, so as to be highly resistant to materials in the form of lumps or the like. The probe 12 may assume any known or suitable form.

When the material to be detected is not present in the space 14, the electrode probe 12 has an initial electrical capacitance to ground or to the walls of the container 16. In most cases, the container walls are electrically connected to earth ground.

Figure 1D:
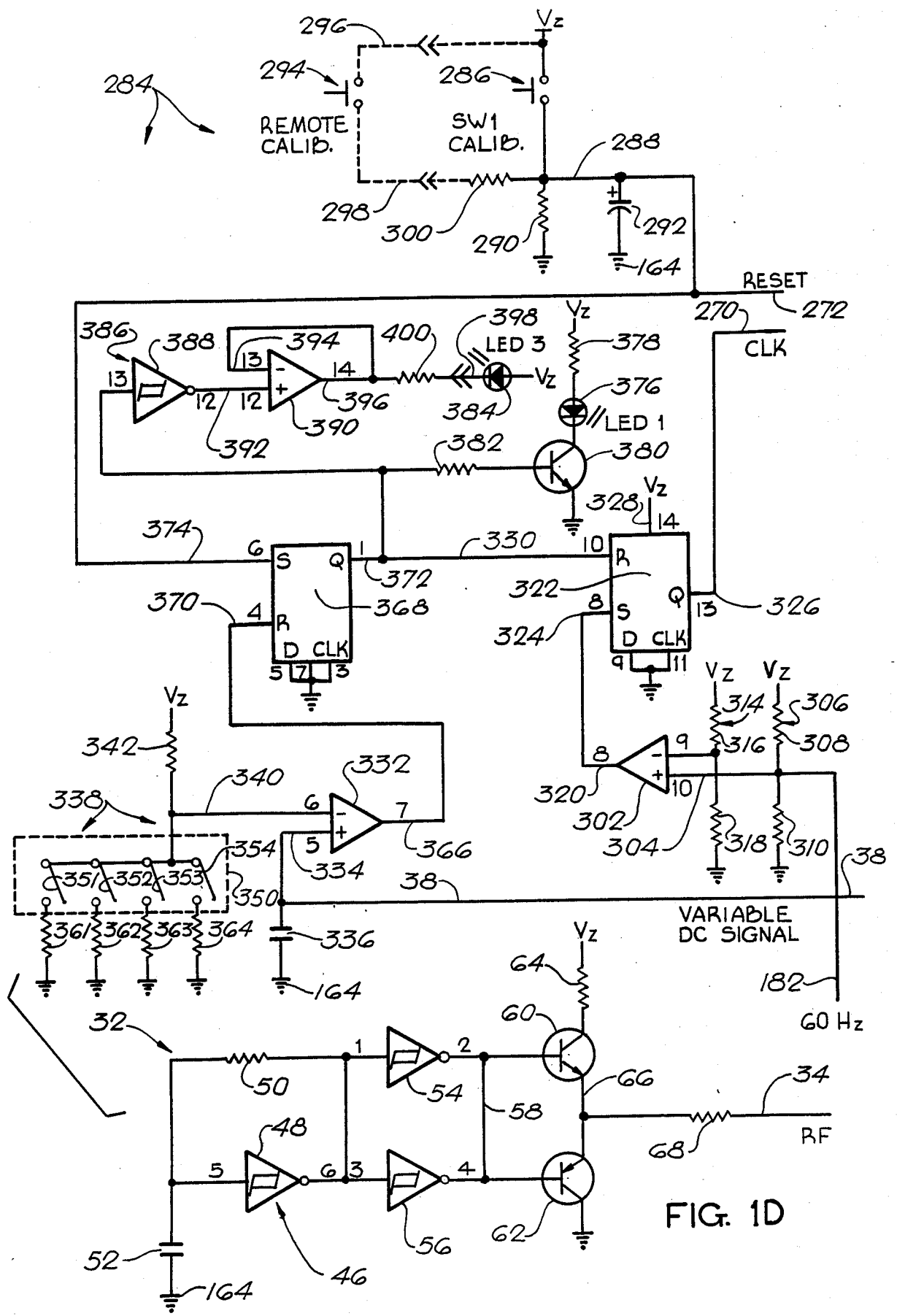

In order to produce RF electrical energy, the system 10 comprises a RF source or generator 32, as shown in FIG. 1D, for producing a substantial RF voltage, relative to ground, which is supplied to an ungrounded RF distribution line 34, extending from FIG. 1B into FIGS. 1A and 1C. In FIG. 1A, the RF distribution line 34 acts as the RF input of an electronic control circuit 36, to which the capacitance probe 12 is connected in such a manner that an initial RF voltage relative to ground is supplied to the probe 12. The electronic control circuit 36 may also be characterized as an electronic translating circuit, or an electronic filter. The electronic control circuit 36 has the capability of translating the variable capacitance of the probe 12 into a variable direct current (DC) signal at an ungrounded output line or terminal 38 of the control circuit 36.

In FIG. 1A, the output signal line 38 is connected to the input 40 of an output circuit or means 42 which responds to the variable DC output signal and triggers or changes the state of an output or utilization device 44, illustrated as an electromagnetic relay. When the DC output signal changes to the triggering level or magnitude, the relay 44 may be either actuated or deactuated, according to the selection of the operator. The illustrated relay 44 has an electromagnet coil 44a adapted to shift a movable contact 44b between a normally closed fixed contact 44c and a normally open fixed contact 44d. The relay 44 may be employed to actuate a lamp, horn or other indicator, or to actuate a control system which may have the effect of causing the flowable material to move into or out of the space where the material is to be detected.

FIG. 1D shows details of the RF source or generator 32, the construction of which may be varied, however. As shown, the RF source 32 comprises an RF oscillator circuit 46 utilizing a Schmitt trigger 48 to provide the gain necessary to produce oscillations. The Schmitt trigger 48 may be derived as one unit of a multi-unit integrated circuit. A feedback resistor 50 is connected between the output and the input of the Schmitt trigger 48, while a capacitor 52 is connected between the input and chassis ground 164, which also serves as the grounded negative terminal of the power supply. It will be understood that DC power is also supplied to the Schmitt trigger 48, by means not shown. The values of the resistor 50 and the capacitor 52 determine the oscillating frequency of the RF oscillator 46. Such frequency may be about 900 kilohertz, but the oscillating frequency may be widely varied.

The RF output from the Schmitt trigger 48 is amplified by two additional Schmitt triggers 54 and 56, connected in parallel. Thus, the inputs of both trigger circuits 54 and 56 are connected to the output of the trigger circuit 48, while the outputs of the trigger circuits 54 and 56 are connected to a common output line 58. It will be understood that DC operating power is supplied to the triggers 54 and 56 by means not shown.

Further amplification of the RF voltage is provided by two transistors 60 and 62 of opposite types, having their output electrodes connected in a series circuit which can be traced from the ungrounded regulated power supply terminal Vz along a resistor 64, the collector and emitter of the transistor 60, a lead 66 and the emitter and collector of the transistor 62 to chassis ground. In this case, the ungrounded power supply terminal Vz supplies a regulated positive potential of about 15 volts with respect to the grounded terminal 164. Some other appropriate voltage may be provided, if desired. A current limiting resistor 68 is connected between the lead 66 and the RF distribution line 34. It will be understood that a fixed RF voltage appears between the RF distribution line 34 and chassis ground 164, which also serves as RF ground and the grounded terminal of the DC power supply.

FIG. 1A shows specific details of the electronic control circuit 36 which supplies radio frequency energy to the probe 12 and provides a variable DC output signal to the signal output line 38 in response to variations in the capacitance of the probe 12 relative to ground. As previously indicated, the electronic control circuit 36 may be characterized as an electronic translating device or an electronic filter. As shown, the electronic control device 36 comprises an active electronic component in the form of a transistor 70. A capacitor 72 and an input lead 74 are connected between the ungrounded RF voltage distribution line 34 and the base of the transistor 70, acting as the ungrounded input electrode of the transistor. The base circuit also includes a first rectifying diode 76 connected from the base lead 74 to chassis ground 164, the diode 76 being polarized to carry positive signals to ground while blocking negative signals. It will be recalled that the RF source 32 has grounded and ungrounded output terminals in the form of the chassis ground 164 and the RF voltage distribution line 34. A resistor 78 is connected between chassis ground and earth ground to be sure that they are connected together by a relatively low resistance. A second rectifying diode 80 is connected between the emitter and the base of the transistor 70 and is polarized to conduct positive current between the emitter and the base, while blocking negative current in that direction. It will be noted that the diodes 80 and 76 are effectively in series between the emitter of the transistor 70 and ground, so that any direct current between the emitter and ground has to flow through these two diodes.

Radio frequency energy is transmitted between the emitter of the transistor 70 and the capacitance probe 12 by a series circuit comprising a resistor 82 and a blocking capacitor 84, which prevents any direct current flow in either direction between the probe 12 and the emitter of the transistor 70. The capacitor 84 has a value such that it provides a relatively low reactance to radio frequency current, while affording a high reactance to any possible stray 60 hertz currents. As shown, a capacitor 86 is connected between the probe 12 and the ungrounded regulated power supply terminal Vz. The capacitor 86 has a small capacitance value, such as only about one picofarad (pf), which is effectively added to the initial capacitance of the probe 12 relative to ground. The emitter of this transistor 70 acts as the ungrounded RF output terminal to supply RF voltage to the probe 12.

A rectifying diode 88 is connected between the variable DC signal or output line 38 and the collector of the transistor 70. The diode 88 is polarized to conduct positive current between the variable DC line 38 and the collector. A resistor 90 is connected between the ungrounded positive power supply terminal Vz and the variable DC signal line 38. Thus, the resistor 90 applies a positive voltage to the signal line 38, so that such positive voltage is available to produce direct current through the collector and the emitter of the transistor 70. Referring to FIG. 1A, the translating transistor 70 varies the DC signal current along a DC signal path between the DC signal line 38 and ground. Such DC signal path can be traced along a series circuit comprising the diode 88, the collector-emitter path of the transistor 70, the diode 80, and the diode 76. The diodes 80 and 76 are polarized alike in this DC signal path or circuit, to conduct the DC collector-emitter current of the transistor 70. The resistor 90 affords a DC supply path between the ungrounded DC power supply terminal Vz and the DC signal line 38.

As shown in FIG. 1A, the output or utilization circuit 42 comprises an active electronic component in the form of a comparator 92 having its inverting input 93, marked with a minus sign, connected to the input terminal 40, which, in turn, is connected to the variable DC signal line 38. The comparator 92 may be one unit of a multi-unit integrated circuit module. The comparator 92 also has a noninverting input 94, marked with a plus sign, to which a positive reference voltage is supplied by a voltage divider 96, comprising a first resistor 98, a junction conductor 100, and a second resistor 102, connected between the ungrounded regulated power supply terminal Vz and ground. The non-inverting input 94 is connected to the junction conductor 100 so that a certain fraction of the positive power supply voltage is supplied to the noninverting input, to afford the desired reference voltage. The comparator 92 is a logic switching device which operates so that the output terminal 104 of the comparator 92 goes to a high state, when the reference voltage at the non-inverting input 94 is greater than the variable DC signal voltage at the inverting input 93. When the signal voltage at the inverting input 93 becomes greater than the reference voltage at the non-inverting input 94, the output terminal 104 goes to a low state, which may be approximately zero voltage. The high state may be approximately the regulated power supply voltage, or some fraction thereof.

In FIG. 1A, a filtering capacitor 106 is connected between the ungrounded output terminal 104 of the comparator 92 and ground. An output or ON indicator circuit 108 is also connected to the output terminal 104, such indicator circuit 108 comprising a light emitting diode (LED) 110 connected in series with a resistor 112 between the output terminal 104 and ground. The LED 110 is energized when the output terminal 104 goes to a high state.

Following the comparator 92 in FIG. 1A, the output circuit 42 comprises a time delay circuit 114, whereby a variable time delay can be introduced. The illustrated time delay circuit 114 is in the form of a series circuit comprising a fixed resistor 116, a variable resistor 118, a time delay output terminal 120, and a capacitor 122, all connected in series between the comparator output terminal 104 and ground. The time delay is due to the time required to charge the capacitor 122 through the resistors 116 and 118 when the output terminal 104 of the comparator 92 goes to a high state. The time delay is comparable to the variable value of the mathematical product RC. Thus, the fixed resistor 116 provides a minimum time delay amounting to a fraction of one second. The variable resistor 118 is capable of varying the time delay from the minimum value to a much larger value on the order of twelve seconds.

In FIG. 1A, the time delay circuit 114 is followed by a sequence of two active electronic components, illustrated as first and second Schmitt triggers 124 and 126, which may be units of a multi-unit integrated circuit. The Schmitt triggers 124 and 126 provide definite ON and OFF states at the end of the time delay interval. It will be seen that the time delay output terminal 120 is connected to the input 128 of the first Schmitt trigger 124. The output 130 of the first Schmitt trigger 124 is connected to a selector switch contact 132 which is labeled HIGH. The input 134 of the second Schmitt trigger 126 is connected to the output 130 of the first Schmitt trigger 124. The output 136 of the second Schmitt trigger 126 is connected to a selector switch contact 138, labeled LOW. The fixed switch contacts 132 and 138 of FIG. 1A are elements of a selector switch 140, also having a movable contact 142 which is selectively movable between the fixed contacts 132 and 138, at the option of the operator. The selector switch 140 makes it possible to select between two modes of operation, as to whether the system is to detect and respond to a high material level, or a low material level. The movable switch contact 142 is connected through a resistor 144 to the base of a transistor 146 which provides sufficient power to energize the relay coil 44a so as to actuate the relay 44. In this case, the relay coil 44a is energized from a positive power supply terminal 148 labeled +28 V, meaning that a positive potential of about 28 volts is provided. A series circuit can be traced from the power supply terminal 148 through a resistor 150, the relay coil 44a, and the collector and emitter of the transistor 146 to ground. A back polarized rectifier diode 152 is connected in parallel with the relay winding 44a and is reversely polarized so that the main positive current, flowing through the resistor 150 and the relay coil 44a from the power supply terminal 148 to the collector of the transistor 146, is not diverted by the diode 152. The diode 152 is polarized to conduct positive current in the other direction, away from the collector of the transistor 146 and around the coil 44a, to act as a damper in a well known manner to prevent the formation of a high voltage spike across the coil 44a when the transistor 146 becomes nonconductive to deenergize the relay coil 44a. The high voltage spike, due to the collapsing magnetic field around the coil 44a, might otherwise damage the transistor 146. The energization of the relay coil 44a causes the movable relay contact 44b to move between the normally closed contact 44c and the normally open contact 44d. This relay switching operation may be employed to energize or deenergize a horn, light or other indicator, or to energize or deenergize a control system which may cause the movement of the material into or out of the space where the material is to be detected.

As shown in FIG. 1B, the control system 10 comprises a power supply circuit 154 which supplies the regulated power supply voltage of approximately 15 volts to the terminal Vz, and also the power supply voltage to the +28 V terminal. The power supply circuit 154 may be of any known or suitable construction, but is illustrated in FIG. 1B as comprising a power transformer 156 having two primary windings 158 and 160, as well as a secondary winding 162, which provides approximately 24 volts of alternating current (AC). Either of the two primary windings 158 and 160 may be used individually, or the two windings may be connected in parallel, for connection to an ordinary 110 volt AC power line. The two windings 158 and 160 may be connected in series, for connection to a 220 volt AC power line.

One end of the secondary winding 162 is connected to chassis ground 164, which is indicated by the conventional ground symbol in the other views. The other end terminal 166 of the secondary winding 162 is connected through a power rectifier diode 168 to a line 170, leading to the +28 volt terminal, which energizes the relay coil 44a in FIG. 1A. In FIG. 1B, a filter capacitor 172 is connected between the line 170 and ground, to smooth out the rectified ripple voltage, so that a fairly steady DC voltage is provided on the line 170, having an average value of about 28 volts. To provide the regulated DC voltage at the terminal Vz, a voltage regulator module 174 is connected between the line 170 and a line 176 leading to the Vz terminal. Another filter capacitor 178 is connected between the line 176 and the ground terminal 164. The voltage regulator module 174 also has a connection 180 to ground. The voltage regulator module 174 may take the form of a commercially available integrated circuit which provides a substantially smooth, ripple-free output of approximately 15 volts at the terminal Vz.

The power supply circuit 154 of FIG. 1B also includes an AC output line 182, labeled 68c, to supply a 60 hertz output voltage for generating pulses in the calibration circuit, to be described presently. The 60 hertz voltage is derived from the end terminal 166 of the secondary winding 162 and is transmitted to the AC output line 182 by a voltage divider 184 and a coupling capacitor 186. The voltage divider 184 comprises a resistor 188, a junction 190, and a resistor 192, connected in series between the terminal 166 and ground. The capacitor 186 is connected between the junction 190 and the AC output line 182, so as to transmit AC while blocking any flow of DC.

It will helpful at this point to describe the operation of the circuits shown in FIG. 1A, such circuits constituting portions of the complete system 10. The RF source 32 supplies the RF distribution line 34 with an RF voltage comparable to the DC power supply voltage of 15 volts. The RF voltage has a pulsed waveform. In the RF input circuit of the electronic control circuit 36, the RF voltage causes a combination of RF current and direct current through the capacitor 72 and the rectifying diode 76, so that the capacitor 72 is charged, to produce a biasing voltage which is applied to the base of the transistor 70, along with components of the RF voltage. The biasing voltage tends to reduce or cut off the current between the collector and the emitter of the transistor 70, so that only a small RF voltage is transmitted initially to the capacitance probe 12. When the material to be detected is not in contact with the probe 12, or in the immediate proximity of the probe, the capacitance of the probe 12 is low, so that the capacitive reactance of the probe 12 is high, and the RF voltage transmitted to the probe 12 is low, only on the order of about 2 volts. The current between the collector and the emitter of the transistor 70 is low. Such current is pulsating direct current, with an RF component, due to the rectifying action of the diode 88, as well as the rectifying action of the transistor 70 itself. Due to the low current through the transistor 70, the effective resistance of the transistor is high, so that the output signal on the variable DC signal line 38 is high. This high signal voltage is applied to the inverting input 93 of the comparator 92 and is higher than the reference voltage at the noninverting input 94, so that the output 104 of the comparator 92 is at a low state of approximately zero volts. Thus, the ON indicator LED 110 is not on, and the output circuit 42 is in a OFF state.

If the material to be detected comes into contact with the probe 12, the capacitance of the probe to ground is materially increased, while the capacitive reactance of the probe is correspondingly decreased. The electronic control circuit 36 acts in the manner of an electronic filter circuit, so that the increased capacitance of the probe 12, and the correspondingly decreased capacitive reactance thereof, cause a significantly increased RF current component to flow between the emitter and the collector of the transistor 70, whereby the rectified signal output through the diode 88 and from the variable signal line 38 is increased, causing the signal voltage on the line 38 to decrease, to such an extent that the signal voltage at the inverting input 93 of the comparator 92 becomes less than the reference voltage at the noninverting input 94. Thus, the output 104 of the comparator 92 goes high, to approximately 15 volts, so that the indicator LED 110 is lighted, indicating an ON condition. After the time delay produced by the time delay circuit 114, the input 128 of the Schmitt trigger 124 is at a high state, so that the output 130 goes to a low state. The output of the second Schmitt trigger 126 goes to a high state. When the selector switch 140 is set as shown in FIG. 1A, with the movable contact 142 engaging the fixed contact 138, the high state at the output 136 of the second Schmitt trigger 126 causes the transistor 146 to become conductive, so that the relay coil 44a is energized. The movable relay contact 44b is moved between the normally closed contact 44c and the normally open relay contact 44d. Either of the contacts 44c and 44d may be connected to a horn, lamp or other indicator, or to a utilization device for causing movement of the material into or out of the space where the presence of the material is to be detected. The labels HIGH and LOW, as applied to the switch contacts 132 and 138, represent the customary positions of the selector switch 140, when the system is employed to detect a high level of the material, or a low level. In any event, the selector switch 140 may be operated to either of its positions, to cause the relay 44 to be either energized or deenergized, in response to a high state at the output 104 of the comparator 92.

When the material has come into contact with the capacitance probe 12, and then recedes from the probe, some of the material clings or adheres to the probe 12, so as to cause an increase in the minimum capacitance of the probe. In effect, the adherent material changes the calibration of the capacitance probe 12, in that the minimum capacitance of the probe is increased, for the state when the material is absent from the probe. When the material is present around the probe, the capacitance is greater than when the material is absent, but there is less difference between the material-present and the material-absent values of the capacitance, so that it becomes more difficult for the system to distinguish between the material-present and the material-absent capacitance values. There is a need for recalibrating the material detection system 10, to compensate for the change in the calibration of the capacitance probe 12.

The system 10 meets this need by providing a calibrating circuit 194, shown in FIGS. 1C and 1D. The calibrating circuit 194 includes a balancing circuit 196, largely shown in FIG. 1C, for changing the initial supply of current to the signal line 38, so as to offset or balance the change in the initial current demand on the signal line 38, due to the change in the calibration of the capacitance probe 12. The balancing circuit 196 affords a variable or adjustable balancing signal or supply current path from the power supply terminal Vz to the signal line 38. The variable current path can be traced from the power supply terminal Vz in FIG. 1C along a series circuit including a resistor 198, a junction 200, a resistor 202, a junction 204, two rectifying diodes 206 and 208 connected in series, a junction 210, a resistor 212, the emitter and collector of a transistor 214, and a conductor line 216 leading to the variable DC signal line 38. The transistor 214 is employed as an active electronic element in the balancing circuit 196, to control the supply of current from the power supply terminal Vz to the signal line 38.

In FIG. 1C, the balancing circuit 196 comprises a variable or adjustable capacitance 218, the value of which can be varied or selected to correspond with the increased material-absent capacitance of the probe 12 due to adherent material. The transistor 214 functions in an electronic control circuit 220 for the variable capacitance 218, in a manner similar to the functioning of the transistor 70 in the electronic control circuit 36 for the capacitance probe 12. The variable or adjustable capacitance 218 is illustrated as a switchable binary capacitance bank, which will be used as another name for the variable capacitance 218. The binary capacitance bank 218 is illustrated as comprising eight fixed capacitors 221, 222, 223, 224, 225, 226, 227 and 228 having graded capacitance values arranged in an approximately binary sequence, so that each successive value in the sequence is approximately twice the preceding value.

In the preferred embodiment of FIG. 1C, the eight capacitors 221-228 have respective capacitance values of 1, 2, 4, 8, 15, 30, 60 and 120 picofarads (pf). By switching the eight capacitors 221-228 in various parallel combinations, it is possible to adjust or vary the capacitance of the capacitance bank 218 in steps of 1 pf from 1 pf to 240 pf. The capacitors 221-228 are adapted to be switched in parallel between conductor lines 230 and 232 which are components of the balancing circuit 196. The line 230 is connected to the junction 210, from which the resistor 212 extends to the emitter of the transistor 214. The line 232 is connected to the junction 200, from which the resistor 202 extends to the junction 204, which is connected directly to the base of the transistor 214 along a lead 234. It will be seen that a coupling capacitor 236 is connected between the RF distribution line 34 and the lead 234, so that the RF voltage from the RF generator 32 is supplied to the base of the transistor 214, in a manner similar to the supply of the RF voltage to the base of the transistor 70 in the electronic control circuit 36 for the capacitance probe 12. As shown, a rectifying diode 238 is connected between the regulated power supply terminal Vz and the lead 234 which extends to the base of the transistor 214.

The electronic control circuit 220 functions somewhat in the manner of an electronic filter, to vary the current between the emitter and the collector of the transistor 214, in accordance with variations in the value of the capacitance bank 218. Initially, if the capacitance value is small, such as 1 picofarad, the collector current of the transistor 214 to the variable DC signal line 38 is very small. As the capacitance value of the capacitance bank 218 is increased, the collector current of the transistor 214 is correspondingly increased, so that a greater current is supplied to the signal line 38. As the capacitance value is increased, the capacitive reactance is decreased, and the effective resistance of the transistor 214 is correspondingly decreased, so that there is a decreasing resistance between the regulated power supply terminal Vz and the DC signal line 38.

The conductor line 216 from the collector of the transistor 214 is also shown in FIG. 1A and may be characterized as the connecting link between FIGS. 1C and 1A. The decreasing resistance of the transistor 214, due to the increased capacitance of the capacitance bank 218, has the effect of balancing or neutralizing the decreased resistance of the transistor 70, due to the increased material-absent capacitance of the probe 12. Thus, the tendency of the increased capacitance of the probe 12 to reduce the DC signal voltage on the line 38 is balanced by the effect of the increased capacitance of the capacitance bank 218, tending to increase the signal voltage on the line 38. It will be evident that the balancing effect of increasing the capacitance value of the capacitance bank 218 tends to prevent the increased material-absent capacitance of the probe 12 from drawing the signal voltage on the line 38 downwardly to such an extent that the signal voltage on the inverting input 93 of the comparator 92 is less than the reference voltage at the noninverting input 94, which would cause a false or unwanted high state at the output 104 of the comparator 92.

As shown in FIG. 1C, the balancing circuit 196 comprises a binary switching circuit or means 240 for switching the successive parallel combinations of the capacitors 221–228 between the conductor lines 230 and 232, extending to the electronic control circuit 220. The illustrated switching circuit 240 comprises a binary stepper module 242, which is preferably in the form of a commercially available integrated circuit. The stepper module 242 has eight outputs, labelled Q4, Q5, Q6, Q7, Q8, Q9, Q10 and Q11 in FIG. 1C, which are connected through a bank 250 of eight driver amplifiers 251, 252, 253, 254, 255, 256, 257 and 258 to the operating coils of eight magnetic relays 261, 262, 263, 264, 265, 266, 267 and 268 having normally open pairs of relay contacts, adapted to connect the respective capacitors 221–228 to the conductor line 230. Each of the pairs of normally open relay contacts is connected between the line 230 and one side of the corresponding capacitor in the capacitance bank 218. The other side of each capacitor is connected to the conductor line 232. The amplifier bank 250 is preferably in the form of a commercially available integrated circuit which incorporates the eight driver amplifiers 251–258.

The illustrated stepper module 242 includes a clock input 270, labelled CLK, adapted to receive clock pulses for causing the module 242 to step through its series of 240 switching operations. The stepper module 242 also has a RESET input 272, to receive a pulse or signal which will reset the module 242, back to the beginning of its switching series, as well as a ground terminal 274 and a power supply input terminal 276. A rectifying diode 278 is connected between the regulated power supply terminal Vz and the power input terminal 276. Battery backup is provided by a battery 280 having its negative terminal grounded, while having its positive terminal connected through a rectifying diode 282 to the power supply input terminal 276. The battery backup maintains the electronic memory in the stepper module 242, in case of AC power failure. A battery voltage of only about 3.6 volts is sufficient to maintain the electronic memory. The diode 282 prevents reverse current through the battery during AC operation. The diode 278 prevents battery drain by way of the Vz terminal during battery operation.

It will be understood that by delivering a series of 240 pulses to the clock input 270 of the binary stepper module 242, the relay switches 261–268 will be closed in a series of 240 combinations, so that the capacitance bank 218 will be stepped from zero through successive capacitance values of 1 through 240 pf, in steps of 1 pf. By stopping the supply of pulses, the capacitance bank 218 can be switched to any desired value from 1 through 240 pf. A pulse or signal at the reset terminal 272 will reset the stepper module 242 back to the beginning of its switching series, so that the capacitance bank 218 will be switched back to zero. Subsequent pulses at the clock input 270 will again start the stepping process through capacitance values of 1 through 240 pf.

As shown in FIG. 1D, the balancing circuit 196 includes a control circuit 284 which selectively controls the pulsing and the resetting of the binary stepper module 242, for calibrating the system 10 to balance changes in the calibration of the capacitance probe 12. The control circuit 284 comprises a pushbutton calibration switch 286, labelled CALIB., which is normally open and is adapted to be closed, to initiate the calibration process. Momentary closure of the switch 286 resets the binary stepper 242 to its starting condition, in which the capacitance bank 218 has a value of zero. Thus, the calibration switch 286 is connected between the regulated power supply terminal Vz and a conductor line 288 extending to the reset input 272 of the stepper module 242. A resistor 290 and a filter capacitor 292 are connected in parallel between the line 288 and ground. The capacitor 292 is charged when the calibration switch 286 is closed, and then gradually discharges through the resistor 290 when the calibration switch 286 is opened. The capacitor 292 ensures that a sufficiently long pulse is applied to the reset input 272 to reset the stepper module 242.

A remote calibration switch 294 may also be connected in parallel with the main calibration switch 286, by means of remotely extending conductor lines 296 and 298, with a protective resistor 300 connected in series with the line 298. The remote calibration switch 294 is also of the pushbutton type. It may be located at a remote control location.

The pulses to step the binary stepper module 242 are derived in this case from the 60 hertz line 182, which appears in FIG. 1D, as well as in FIG. 1B. The 60 hertz line 182 carries an AC voltage on the order of 4 volts. As shown in FIG. 1D, pulses are derived from the 60 hertz voltage by pulse generating means in the form of a comparator 302 having its noninverting input 304 connected to the 60 hertz line 182. The comparator 302 may comprise one unit of a multi-unit integrated circuit. A positive DC bias voltage is also applied to the noninverting input 304 by a voltage divider 306 comprising a first resistor 308 connected between the Vz power supply terminal and the input 304, and a second resistor 310, connected between the input 304 and ground.

A reference voltage is supplied to the inverting input 312 of the comparator 302 by another voltage divider 314, comprising a resistor 316, connected between the DC power supply terminal Vz and the inverting input 312, and another resistor 318 connected between the inverting input 312 and ground.

In this case, the values of the resistors 308, 310, 316 and 318 are selected so that the DC bias voltage on the noninverting input 304 is greater than the DC reference voltage on the inverting input 312. Thus, the output 320 of the comparator 302 tends to be switched to a high state by the bias voltage on the noninverting input 304. However, it will be recalled that a 60 hertz AC voltage is also superimposed upon the noninverting input 304 from the conductor line 182. The negative peaks of the AC voltage cause the voltage at the noninverting input 304 to drop below the reference voltage at the inverting input 312, so that the output 320 of the comparator 302 is switched to the low state at a pulse rate of 60 hertz. The waveform of the 60 hertz pulses is approximately square.

In FIG. 1D, the control circuit 284 also includes an electronic gate in the form of a flip-flop 322, to control the supply of the 60 hertz pulses from the output 320 of the comparator 302 to the clock input 270 of the stepper module 242. The flip-flop 322 is preferably provided as a unit of an integrated circuit. In this case, the output 320 of the comparator 302 is connected to the S input 324 of the flip-flop 322. The Q output 326 of the flip-flop 322 is connected to the clock input 270 of the stepper module 242. The power supply input 328 is connected to the terminal Vz. It will be seen that the D input and the clock inputs of the flip-flop 322 are grounded.

When the flip-flop gate 322 is open, as it is immediately after operation of the reset switch 286, the 60 hertz pulses at the S input 324 are reproduced at the Q output 326 and are supplied to the clock input 270 of the stepper module 242. The opening and closing of the gate 322 ar controlled by the R input 330, as will be described presently.

In FIG. 1C, the binary stepper module 242 incorporates a divider circuit which divides the pulse rate of the clock pulses at the input 270 by a divisor of 8, so that the stepping rate of the module 242 is 7.5 pulses per second, which is ⅛ of 60 hertz. This relatively low stepping rate ensures that the relays 261-268 will function properly. Thus, after the module 242 is reset by the momentary closure of the calibration switch 286, the stepper 242 starts to step upwardly from its initial state, so that the capacitance bank 218 is switched upwardly from zero in steps of 1 pf at a rate of 7.5 steps per second. In a manner now to be described, the stepper module 242 is stopped automatically, when the capacitance bank 218 reaches a capacitance value which achieves the desired degree of balance with the minimum capacitance of the probe 12, with material absent from the probe. The stopping signal is developed by portions of the control circuit 284, shown in FIG. 1D, in response to the variation of the DC signal on the line 38. Such variation is due to the switching of additional capacitance into the capacitance bank 218.

In FIG. 1D, the calibration control circuit 284 includes a detector or sensor, illustrated as another comparator 332 having its noninverting input 334 connected to the variable DC signal line 38, so that the comparator 332 is responsive to the desired or selected variation of the DC signal on the line 38. A filter capacitor 336 is connected between the line 38 and ground, to reduce high frequency spikes in the signal on the line 38.

To provide a sensitivity control 338, an adjustable or selectable reference voltage is supplied to the inverting input 340 of the comparator 332 for varying the threshold or triggering level at which the comparator 332 responds to the changing signal on the signal line 38. As illustrated, the sensitivity control 338 takes the form of a switchable voltage divider, comprising a resistor 342, connected between the power supply terminal Vz and the inverting input 340, and a sensitivity switch assembly 350 comprising four individually operable switches 351, 352, 353 and 354, adapted to connect four different resistors 361, 362, 363 and 364 between the inverting input 340 and ground. The resistors 361-364 have graded resistance values, to provide graded reference voltage values at the inverting input 340, when the switches 351-354 are individually closed. In terms of equivalent incremental capacitance values, the four switches 351-354 may provide sensitivity values of approximately 1 pf, 4 pf, 8 pf and 15 pf, respectively. These sensitivity values represent the approximate incremental capacitance which the material must add to the minimum capacitance of the probe 12, in order to trigger the output comparator 92 and to change the state of the output relay 44. For low sensitivity, the upward stepping of the capacitance bank 218 is continued longer, so that the total capacitance value of the capacitance bank 218 is greater than the minimum or material-absent capacitance of the probe 12, by an amount corresponding approximately to the equivalent sensitivity setting. For high sensitivity, the switching of the capacitance bank 218 is stopped sooner, so that there is a smaller difference between the calibrated capacitance of the capacitance bank 218 and the minimum capacitance of the probe 12, with material absent therefrom, except for adherent material.

As the capacitance 218 is stepped upwardly by the pulsing of the binary stepper 242, the signal level on the line 38 is stepped upwardly. When the signal voltage at the non-inverting input 334 of the comparator 332 becomes greater than the reference voltage, determined by the sensitivity setting, at the inverting input 340, the output 366 of the comparator 332 goes to a high state, which has the effect of closing the electronic gate or flip-flop 322, so that the 60 hertz pulses are no longer supplied to the Q output, nor to the clock input 270 of the stepper module 242, with the result that the stepper module 242 stops at the attained count, with the capacitance bank 218 switched to a particular capacitance value, representing the new calibration of the balancing circuit 196. This calibration is retained by the memory of the stepper module 242, until the calibration switch 286 is again closed by the operator.

The electronic gate or flip-flop 322 is switched to its closed or OFF state by another flip-flop or gate 368, connected between the comparator output 366 and the flip-flop 322. It will be seen that the comparator output 366 is connected to the R input 370 of the flip-flop 368, which has its Q output 372 connected to the R input 330 of the flip-flop 322. The S input 374 of the flip-flop 368 is connected to the RESET input 272 of the stepper module 242. Thus, the S input 374 is momentarily switched to a high state when the calibration switch 286 is closed. Simultaneously, the resetting of the stepper module 242 has the effect of dropping down the signal on the DC signal line 38, so that the output 366 of the comparator 332 is switched to a low state. This causes the gate 322 to turn ON, so that another cycle of calibration gets underway. During calibration, the gate 322 is ON. During normal operation of the RF capacitance probe system 10, the gate 322 is OFF.

The control circuit 284 of FIG. 1D also includes a calibration indicator, illustrated as an LED 376, connected in series with a resistor 378 between the power supply terminal Vz and the collector of a transistor 380 having its emitter connected to ground. A resistor 382 is connected between the base of the transistor 380 and the Q output 372 of the flip-flop 368. Provision is also made for a remote calibration indicator, shown as another LED 384, controlled by a drive circuit 386 comprising a Schmitt trigger 388 and a comparator 390, which are preferably units of multi-unit integrated circuits. As shown, the input of the Schmitt trigger 388 is connected to the Q output 372 of the flip-flop 368. The output of the Schmitt trigger 388 is connected to the noninverting input 392 of the comparator 390. The inverting input 394 of the comparator 390 is connected to the output 396 thereof. In the illustrated circuit 386, the LED 384 is connected in series with a lead 398 and a resistor 400, between the power supply terminal Vz and the comparator output 396. When the input of the Schmitt trigger 388 goes high, the LED 384 is energized. When the input of the Schmitt trigger 388 goes low, the LED 384 is deenergized. More specifically, when the input of the Schmitt trigger goes high, the output thereof goes low, so that the noninverting input 392 of the comparator 390 goes low, whereupon the output 396 goes low, to essentially zero voltage. Accordingly, the lead 398 is energized by the voltage between the terminal Vz and the zero voltage at the output 396 of the comparator. When the input of the Schmitt trigger 388 goes low, the output thereof goes high, so that the noninverting input 392 of the comparator also goes high causing the output 396 to go high. The LED 384 is deenergized, because there is very little or no voltage difference between the Vz terminal and the output 396 of the comparator.

SUMMARY OF OPERATION

While the operation of the illustrative embodiment 10 has already been described in detail, it may be helpful to set forth a brief summary. The RF capacitance probe 12 (FIG. 1A) has a small initial or minimum capacitance to ground, before any of the material t be detected is brought into contact with the probe 12. The associated electronic control circuit 36, utilizing the transistor 70, receives a considerable RF voltage along the RF distribution line 34 from the RF source 32. The RF voltage is on the order of the regulated DC power supply voltage of 15 volts. A considerable RF voltage is supplied to the base of the transistor 70, but only a small RF voltage, on the order of 1 or 2 volts, is delivered to the probe 12 by the emitter, which acts as the RF output terminal of the transistor 70. Moreover, only a small unidirectional or DC signal current flows through the diode 88 and between the collector and emitter of the transistor 70. This signal current is drawn from the variable DC signal line 38. The effective initial resistance of the transistor 70, between the signal line 38 and ground, is quite high, because of the low current drawn by the transistor 70.

The signal voltage on the line 38 is also a function of the effective resistance of the transistor 214 in the electronic control circuit 220 of the balancing circuit 196, as shown in FIG. 1C. The signal line 38 is supplied with voltage and current from the power supply terminal Vz along the series path comprising the resistor 198, the resistor 202, the diodes 206 and 208, the resistor 212, and the emitter and collector of the transistor 214. A small amount of additional current is supplied to the signal line 38 by the high value resistor 90, connected between the power supply terminal Vz and the line 38, as shown in FIG. 1A. The resistor 90 is in parallel with the series path which includes the transistor 214. The variable resistance of the balancing transistor 214 and the variable resistance of the probe transistor 70 act in the manner of a variable voltage divider, to adjust and vary the signal voltage on the line 38.

Even at the start-up of the control system 10, it is desirable to go through a calibration cycle, for properly establishing the initial voltage on the signal line 38, and for properly effectuating the initial operation of the sensitivity control circuit 338 of FIG. 1D. One of the four sensitivity control switches 351–354 is closed, to establish a particular reference voltage at the inverting input of the comparator 332. The selection of the particular sensitivity switch is made on the basis of experience, information and judgement as to the characteristics of the material to be detected. The sensitivity should be only as high as necessary to detect the particular material on a reliable basis.

Calibration is started by momentarily closing the pushbutton switch 286, so that the power supply voltage is supplied to the reset input 272 of the binary stepper module 242, whereby all of the eight relays 261–268 are deenergized, so that the capacitance bank 218 of FIG. 1C is reset to zero. In this way, the effective resistance of the balancing transistor 214 is maximized. The initial minimum capacitance of the probe 12 is sufficiently great, including the 1 pf capacitance of the capacitor 86, to produce enough current and a low enough resistance along the collector-emitter path of the probe transistor 70 to draw down the voltage on the signal line 38 to a value less than the reference voltage at the inverting input 340 of the comparator 332 so that the output 366 of the comparator 332 is in a low state. The reference voltage at the inverting input 340 is established by the sensitivity adjusting circuit 338 and is selected by closing one of the four control switches 351–354. The voltage on the signal line 38 is applied to the noninverting input 334 of the comparator 332. The draw down of the signal voltage on the line 38 to a value less than the reference voltage at the inverting input 340 of the comparator 332 insures that calibration will get underway normally.

The momentary closure of the calibration switch 286 also sets the flip-flops 368 and 322 to their proper initial states, so that the calibration indicating LEDs 376 and 384 are lighted, and the pulse gate flip-flop 322 is switched ON, so as to transmit the 60 hertz pulses from the output 320 of the comparator 302 to the clock input 270 of the binary stepper module 242.

In the binary stepper 242 of FIG. 1C, the clock pulse rate of 60 hertz is divided by 8, so that the capacitance bank 218 is stepped upwardly at a pulse rate of 7.5 per second. The capacitance of the bank 218 is stepped upwardly from zero in steps of 1 pf, and is capable of going as high as 240 pf. The upward stepping of the capacitance bank 218 causes the current along the emitter-collector path of the transistor 214 to step upwardly, so that the effective resistance of the transistor 214 is stepped downwardly. As a result, the signal voltage on the line 38 is stepped upwardly in small increments, until the signal voltage at the noninverting input 334 of the comparator 332 (FIG. 1D) becomes greater than the reference voltage at the inverting input 340, whereupon the output 366 of the comparator 332 goes high, which changes the states of the flip-flops 368 and 322, so that the gate flip-flop 322 no longer transmits the 60 hertz pulses to the clock input 270 of the stepper module 242. Consequently, the stepping of the capacitance bank 218 by the stepper module 242 is stopped, with the capacitance bank 218 adjusted to a calibration value of capacitance. The indicator LEDs 376 and 384 are deenergized, to indicate that the calibration process has been completed.

With the calibration completed, the signal voltage on the line 38 is supplied to the inverting input 93 of the output comparator 92 (FIG. 1A) and is greater than the reference voltage at the noninverting input 94 so that the output 104 of the comparator 92 is at a low state. When the material to be detected comes into contact with the probe 12, the capacitance of the probe is materially increased so that there is a substantial increase in the current along the collector-emitter path of the transistor 70, whereby the effective resistance of such path is substantially decreased, so that the signal voltage at the inverting input 93 of the output comparator 92 is drawn down to a value less than the reference voltage at the noninverting input 94, whereupon the output 104 of the comparator goes high. The output indicator LED 110 is lighted. After the time delay established by the time delay circuit 114, the high voltage at the input 128 of the Schmitt trigger 124 causes the output 130 to go low, so that the output 136 of the second Schmitt trigger 126 goes high. With the switch 140 set in the position shown in FIG. 1A, the transistor 146 energizes the relay coil 44a, so that the relay changes to the opposite output state, in that the movable contact 44b moves out of engagement with the normally closed contact 44c and into engagement with the normally open contact 44d. If the selector switch 140 is in its opposite position, with the movable contact 142 engaging the fixed contact 132, the state change of the relay 44 is in the opposite direction. The contacts of the relay 44 may be connected to any desired utilization device or system, which may include a lamp, horn or other indicator, or a control system for causing movement of the material to be detected, into or out of the space around the capacitance probe 12.

When the material recedes or moves away from the probe 12, some of the material may cling or adhere to the probe, so that the capacitance of the probe is reduced, but remains higher than the initial minimum capacitance of the probe. The reduction in the capacitance of the probe 12 reduces the current through the transistor 70 and increases the effective resistance of the collector-emitter path, so that the signal voltage at the inverting input 93 of the output comparator 92 again becomes greater than the reference voltage at the noninverting input 94, whereby the output 104 of the comparator 92 goes low. As a result, the relay 44 is returned to its initial state. With the selector switch 140 in the position shown in FIG. 1A, the relay coil 44a is deenergized.

The adherent material on the probe 12 has changed the calibration of the probe, in that the minimum or material-absent capacitance of the probe 12 is increased. To balance or compensate for this increase, it has become desirable to initiate another calibration or recalibration cycle, by momentary closure of the CALIBRATE switch 286. The remote calibration switch 294 may also be used, if it is installed. As before, the momentary application of the power supply voltage to the RESET input 272 and the S input 374 resets the binary stepper module 242 to zero and changes the flip-flops 368 and 322 to their initial states, so that the gate flip-flop 322 transmits 60 hertz pulses to the clock input 270 of the stepper module 242.

The capacitance bank 218 of FIG. 1C is reset to zero, which maximizes the effective resistance of the transistor 214, and then is stepped upwardly to successively higher capacitance values in steps of 1 pf. The stepping of the capacitance bank 218 causes the effective resistance of the transistor 214 to step downwardly, so that the signal voltage on the signal line 38 is stepped upwardly, until the signal voltage at the noninverting input 334 of the calibrating comparator 332 becomes greater than the reference voltage at the inverting input 340. It will be recalled that such reference voltage is established by closing one of the four sensitivity control switches 351–354. The greater signal voltage at the noninverting input 334 causes the output 366 of the comparator 332 to go high, so that the states of the flip-flops 368 and 322 are reversed, with the result that the 60 hertz pulses are no longer supplied to the clock input 270 of the binary stepper module 242. Moreover, the indicator LEDs 376 and 384 are deenergized. A new calibration voltage has been established on the signal line 38, and such calibration voltage at the inverting input 93 of the output comparator 92 is greater than the fixed reference voltage 94 at the noninverting input, so that the output 104 of the comparator 92 is low.

When the material to be detected again comes into contact with the probe 12, the capacitance of the probe is materially increased, so that the current through the collector-emitter path of the transistor 70 is increased, with the result that the signal voltage on the line 38 is drawn down to a magnitude less than the reference voltage at the noninverting input 94 of the comparator 92, whereupon the output 104 goes high, and the state of the output relay 44 is reversed.

When the material again recedes from the probe 12, the capacitance of the probe is decreased, so that the output 104 of the comparator 92 goes low, and the relay 44 is changed back to its initial state.

With recurrent cycles of use, in which the material to be detected alternately moves into contact with the probe 12, and then recedes from the probe 12, additional material may cling or adhere to the probe 12, so that the calibration of the probe gradually changes. It is desirable to recalibrate the control system 10 at frequent intervals to compensate for the changes in the calibration of the probe 12.

The setting of the sensitivity control circuit 338 affects the immunity of the system to gradual changes in the calibration of the probe 12. With a low sensitivity setting, the minimum capacitance of the probe 12 may drift upwardly to a greater extent, without causing a false or unwanted high or ON state at the output of the comparator 92 and at the output relay 44. The characteristics of the material to be detected will determine how high it is necessary to set the sensitivity control circuit 338. If a higher sensitivity adjustment is necessary, it may be necessary to recalibrate the system more frequently. If the material causes only a small increase in the capacitance of the probe 12, when the material surrounds the probe, it may be necessary to use a high sensitivity setting. If the material causes a greater increase in the capacitance of the probe, a lower sensitivity setting can be used, so that there is less need for frequent recalibration, and greater immunity to the production of false outputs.

EXEMPLARY COMPONENT VALUES AND TYPE NUMBERS

While persons skilled in the art can easily select and assign component values and type numbers to the various components of the illustrative embodiment, and the component values and type numbers are subject to wide variations, the following compilation of exemplary component values and type numbers for the preferred embodiment is being set forth to enable those skilled in the art to construct and utilize the preferred embodiment more easily. This compilation is intended to be helpful and is not intended to limit the scope of the present invention which will be indicated in the appended claims.

INTEGRATED CIRCUITS (IC)

All comparators 92, 302, 332 and 390 may be units of a multi-unit IC, type LM324.

The voltage regulator 174 may be IC LM7815.

All Schmitt triggers 48, 54, 56, 124, 126 and 388 may be units of IC type CD40106.

The binary stepper 242 may be IC type MC14040.

All eight amplifiers 251–258 may be units of IC type UDN6118.

TRANSISTORS

Transistors 60, 70, 146 and 380 may be NPN type 2N3904.

Transistors 62 and 214 may be PNP type MPS404.

SMALLER CAPACITOR VALUES IN PICOFARADS

| SMALLER CAPACITOR VALUES IN PICOFARADS | |
|---|---|
| CAPACITOR | VALUE IN PF |
| 52 | 100 (Polystyrene) |
| 72 | 1500 |
| 84 | 471 |
| 86 | 1 |
| 221 | 1 |
| 222 | 2 |
| 223 | 4 |
| 224 | 8 |
| 225 | 15 |
| 226 | 30 |
| 227 | 60 |
| 228 | 120 |
| 236 | 1500 |

LARGER CAPACITORS IN MICROFARADS

| LARGER CAPACITORS IN MICROFARADS | |
|---|---|
| CAPACITOR | VALUE IN MICROFARADS |
| 106 | .1 |
| 122 | 22 |
| 172 | 1000 |
| 178 | 100 |
| 186 | 2.2 |
| 292 | .1 |
| 336 | .1 |

RESISTORS IN OHMS

| RESISTORS IN OHMS | |
|---|---|
| RESISTORS | VALUES IN OHMS |
| 50 | 10K |
| 64 | 1.5K |
| 68 | 68 |
| 78 | 1K |
| 82 | 1K |
| 90 | 150K |
| 98 | 100K |
| 102 | 15K |
| 112 | 1K |
| 116 | 10K |
| 118 | 500K VARIABLE |
| 144 | 6.8K |
| 150 | 220 |
| 188 | 100K |
| 192 | 22K |
| 198 | 3.3K |
| 202 | 3.3K |
| 212 | 100 |
| 290 | 220K |
| 300 | 100 |
| 308 | 100K |
| 310 | 47K |
| 316 | 100K |
| 318 | 22K |
| 342 | 100K |
| 361 | 2.2K |
| 362 | 6.8K |
| 363 | 22K |
| 364 | 150K |
| 378 | 1K |
| 382 | 10K |
| 400 | 1K |

Various other modifications, alternative constructions and equivalents may be employed without departing from the true spirit and scope of the present invention, as outlined in the appended claims.

I claim:

1. A radio frequency capacitance probe system for material direction, comprising a capacitance probe adapted to be located in a container where material is to be detected, said probe having a minimum capacitance to the container when the material is absent and a substantially increased capacitance when the material is present around the probe, a radio frequency (RF) source for producing a fixed RF voltage, a first electronic translating circuit having an RF input connection to said source and an RF output connection to said probe, said first electronic translating circuit having means including a first active electronic element affording a first DC signal path along which a DC signal current is increased while the DC resistance of said path is decreased in response to increasing capacitance of said probe and consequent increasing RF current into said probe, a DC signal line to which said first DC signal path is connected for drawing current from said line, a first signal level detector having an input connected to said signal line for triggering an output when the signal voltage on said line drops below a first reference level, utilization means connected to said first signal level detector and operative to perform at least one control function in response to the output thereof, a second electronic translating circuit having a second RF input connection to said RF source and a second RF output connection, a variable balancing capacitance connected to said second RF output connection, said second electronic translating circuit having means including a second active electronic element affording a second DC signal path connected to said DC signal line for supplying a variable DC balancing current to said line, said second electronic translating circuit being operative to produce an increased balancing current and a decreased resistance along said second DC signal path in response to increasing the value of said variable capacitance and thereby increasing the RF current therein, and calibration means for varying said variable capacitance to adjust and calibrate the initial voltage on said signal line and thereby to compensate for increases in the minimum capacitance of said probe due to adherent material after the material contacts the probe and then recedes therefrom.

2. A system according to claim 1,
in which said first active electronic element comprises a first transistor,
said second active electronic element comprising a second transistor.

3. A system according to claim 1,
said calibration means comprising electronic stepper means for increasing the value of said variable capacitance in successive steps,
selectively operable resetting means for resetting and starting said electronic stepper means,
and electronic stopping means connected to said DC signal line for stopping said electronic stepper means in response to upward stepping of the voltage on said signal line to a value greater than a calibration level.

4. A system according to claim 3,
including sensitivity control means for adjusting the magnitude of said calibration level and thereby adjusting the difference between said calibration level and said reference level.

5. A system according to claim 3,
said electronic stepper means including a pulse input and being operative to increase the value of said variable balancing capacitance in successive steps in response to successive pulses supplied to said pulse input,
said system including a source of pulses,
and an electronic gate for selectively supplying said pulses to said pulse input,
said electronic stopping means including electronic switching means for switching said electronic gate to an OFF state.

6. A system according to claim 5,
said electronic stopping means including a second signal level detector having a first and second inputs,
said electronic stopping means including sensitivity control means for adjusting the magnitude of said calibration level and for supplying said calibration level to said second input of said second signal level detector,
said second signal level detector having an output connected to said electronic switching means,
said first input of said second signal level detector being connected to said signal line for causing said last-mentioned output to trigger said electronic switching means and thereby switching said electronic gate to an OFF state in response to upward stepping of the voltage on said signal line to a value greater than said calibration level.

7. A radio frequency capacitance probe circuit for material detection, comprising
a capacitance probe adapted to be located in a container where material is to be detected,
said probe having a minimum capacitance relative to the container when the material is absent and a substantially increased capacitance when the material is present around the probe,
a radio frequency (RF) source for producing a fixed RF voltage relative to ground,
a transistor having base, emitter and collector electrodes,
a direct current (DC) power supply having grounded and ungrounded DC supply terminals of opposite polarity,
a coupling capacitor connected between said RF source and said base electrode for supplying RF voltage thereto,
a first rectifying diode connected between said base electrode and said ground,
a second rectifying diode connected between said base and emitter electrodes,
said first and second diodes being oppositely polarized relative to said base electrode,
probe supply means connected between said emitter electrode and said probe for supplying RF voltage to said probe,
a DC signal line,
a DC supply path means connected between said DC signal line and said ungrounded DC supply terminal,
a DC signal circuit including a DC signal path connected between said DC signal line and said collector electrode,
and an output circuit means connected to said DC signal line for producing an output in response to an increased DC signal current along said DC signal path,
said transistor being effective to produce the increased signal current in response to the increased capacitance of said probe due to the presence of the material around said probe.

8. A probe circuit according to claim 7,
said DC signal circuit including said emitter and collector electrodes and also including said first and second rectifying diodes,
said emitter and collector electrodes and said first and second diodes all being polarized alike in said DC signal circuit to conduct the DC signal current in one direction therein.

9. A probe circuit according to claim 8, including a small value capacitor connected between said probe and said ungrounded DC supply terminal for adding to the minimum capacitance of said probe.

10. A probe circuit according to claim 8,
said DC supply path including resistance means connected between said ungrounded DC supply terminal and said signal line for producing a signal voltage thereon which decreases with increasing signal current along said signal circuit,
said output circuit means including a voltage level detector connected to said signal line and responsive to a decrease of the signal voltage below a reference level for producing the output.

11. A probe circuit according to claim 10,
including calibration means for varying the effective resistance of said resistance means to adjust the initial value of the signal voltage when material is absent around the probe and the probe has a minimum capacitance,
whereby the initial signal voltage can be adjusted to compensate for upward drift of the minimum capacitance due to adherent material on said probe.

12. A probe circuit according to claim 11,
said calibration means including an electronic stepper for downwardly stepping the effective resistance of said resistance means,
a selectively operable calibration control for resetting and starting said electronic stepper,
stopping means for stopping said electronic stepper,
and a second voltage level detector connected to said signal line for actuating said stopping means in response to upward stepping of the signal voltage to a sensitivity determining voltage level exceeding said reference level.

13. A probe circuit according to claim 12,
including sensitivity adjusting means for adjusting said sensitivity determining voltage level.

14. A probe circuit according to claim 13,
said calibration means including a switchable capacitance bank connected to said electronic stepper and having a capacitance value which is adjustable upwardly in steps by said electronic stepper,
said switchable capacitance bank having an adjustable capacitive reactance which is adjustable downwardly by said electronic stepper,
and an electronic translating circuit including a second transistor for translating the adjustable capacitive resistance of said capacitance bank into corresponding adjustable resistance,
said second transistor constituting said resistance means to adjust the initial value of the signal voltage.

15. A probe circuit according to claim 7,
said probe supply means comprising a second coupling capacitor.

16. A probe circuit according to claim 15,
said probe supply means including a resistor connected in series with said second coupling capacitor between said emitter electrode and said probe.

17. A radio frequency capacitance probe system for material detection, comprising
a capacitance probe adapted to be located in a container where material is to be detected,
said probe having a minimum capacitance relative to the container when the material is absent and a substantially increased capacitance when the material is present around the probe,
a radio frequency (RF) source for producing a fixed RF voltage relative to ground,
a first electronic translating circuit having an RF input connection to said source and an RF output connection to said probe,
said first electronic translating circuit having means including a first transistor affording a first DC signal path along which a DC signal current is increased while the DC resistance of said path is decreased in response to increasing capacitance of said probe,
a DC signal line to which said first DC signal path is connected for drawing current from said line,
a first signal level detector having an input connected to said signal line for triggering an output when the signal voltage on said line drops below a first reference level,
utilization means connected to said first signal level detector and operative to perform at least one control function in response to the output thereof,
a second electronic translating circuit having a second RF input connection to said RF source and a second RF output connection,
a variable balancing capacitance connected to said second RF output connection,
said second electronic translating circuit having means including a second transistor affording a second DC signal path connected to said DC signal line for supplying a variable DC balancing current to said line,
said second electronic translating circuit being operative to produce an increased balancing current and a decreased resistance along said second DC signal path in response to increasing the value of said variable capacitance,
and calibration means for varying said variable capacitance to adjust and calibrate the initial voltage on said signal line and thereby to compensate for increases in the minimum capacitance of said probe due to adherent material after the material contacts the probe and then recedes therefrom,
said calibration means comprising electronic stepper means for increasing the value of said variable capacitance in successive steps,
selectively operable resetting means for resetting and starting said electronic stepper means,
and electronic stopping means connected to said DC signal line for stopping said electronic stepper means in response to upward stepping of the voltage on said signal line to a value greater than a calibration level.

18. A system according to claim 17,
including sensitivity control means for adjusting the magnitude of said calibration level and thereby adjusting the difference between said calibration level and said reference level.

19. A system according to claim 18,
said electronic stepper means including a pulse input and being operative to increase the value of said variable balancing capacitance in successive steps in response to successive pulses supplied to said pulse input,
said system including a source of pulses,
and an electronic gate for selectively supplying said pulses to said pulse input,
said electronic stopping means including electronic switching means for switching said electronic gate to an OFF state.

20. A system according to claim 19,
said electronic stopping means including a second signal level detector having first and second inputs,
said electronic stopping means including sensitivity control means for adjusting the magnitude of said calibration level and for supplying said calibration level to said second input of said second signal level detector,
said second signal level detector having an output connected to said electronic switching means,
said first input of said second signal level detector being connected to said signal line for causing said last-mentioned output to trigger said electronic switching means and thereby switching said electronic gate to an off state in response to upward stepping of the voltage on said signal line to a value greater than said calibration level.

* * * * *